United States Patent
Uchino et al.

(10) Patent No.: US 10,588,140 B2
(45) Date of Patent: Mar. 10, 2020

(54) USER APPARATUS AND TIMER CONTROL METHOD

(71) Applicant: NTT DOCOMO, INC., Tokyo (JP)

(72) Inventors: Tooru Uchino, Tokyo (JP); Kazuki Takeda, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 124 days.

(21) Appl. No.: 15/542,119

(22) PCT Filed: Feb. 17, 2016

(86) PCT No.: PCT/JP2016/054580
§ 371 (c)(1),
(2) Date: Jul. 7, 2017

(87) PCT Pub. No.: WO2016/133122
PCT Pub. Date: Aug. 25, 2016

(65) Prior Publication Data
US 2018/0176934 A1 Jun. 21, 2018

(30) Foreign Application Priority Data
Feb. 20, 2015 (JP) .................................. 2015-032342

(51) Int. Cl.
*H04W 72/12* (2009.01)
*H04W 72/04* (2009.01)
(Continued)

(52) U.S. Cl.
CPC ... *H04W 72/1231* (2013.01); *H04W 72/0446* (2013.01); *H04W 72/085* (2013.01);
(Continued)

(58) Field of Classification Search
CPC ....................... H04W 72/1231; H04W 72/0446
See application file for complete search history.

(56) References Cited

U.S. PATENT DOCUMENTS

| | | | |
|---|---|---|---|
| 2012/0140743 A1* | 6/2012 | Pelletier | H04W 72/0453 370/335 |
| 2015/0223243 A1* | 8/2015 | Tabet | H04W 28/085 370/330 |

FOREIGN PATENT DOCUMENTS

EP  2816858 A1  12/2014

OTHER PUBLICATIONS

Extended European Search Report issued in corresponding European Application No. 16752508.8, dated Nov. 27, 2017 (10 pages).
International Search Report issued in PCT/JP2016/054580 dated Apr. 26, 2016 (5 pages).
Written Opinion of the International Searching Authority issued in PCT/JP2016/054580 dated Apr. 26, 2016 (3 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
(Continued)

*Primary Examiner* — Samina F Choudhry
(74) *Attorney, Agent, or Firm* — Osha Liang LLP

(57) ABSTRACT

A user apparatus is provided. The user apparatus communicates with a base station in a mobile communication system. The mobile communication system supports carrier aggregation which includes multiple cells including a first cell and a second cell which uses a TTI different from a TTI of the first cell. The user apparatus includes a communication unit configured to transmit and receive a signal to and from the base station; and a timer control unit configured to, according to a type of a control operation performed by the communication unit, determine a TTI as a unit time for operating a timer used for the control operation. The communication unit performs the control operation by operating the timer by using as a unit time the TTI determined by the timer control unit.

20 Claims, 14 Drawing Sheets

(51) Int. Cl.
  *H04W 72/08* (2009.01)
  *H04W 74/08* (2009.01)
  *H04W 24/10* (2009.01)
  *H04L 5/00* (2006.01)
  *H04W 76/28* (2018.01)
  *H04W 76/27* (2018.01)
  *H04W 16/32* (2009.01)
  *H04W 88/08* (2009.01)

(52) U.S. Cl.
  CPC ............ *H04L 5/001* (2013.01); *H04W 16/32* (2013.01); *H04W 24/10* (2013.01); *H04W 74/0833* (2013.01); *H04W 76/27* (2018.02); *H04W 76/28* (2018.02); *H04W 88/08* (2013.01); *Y02D 70/00* (2018.01)

(56) References Cited

OTHER PUBLICATIONS

3GPP TS 36.211 V12.4.0; "3rd Generation Partnership Project; Technical Specification Group Radio Access Network; Evolved Universal Terrestrial Radio Access (E-UTRA); Physical channels and modulation(Release 12)"; Dec. 2014 (124 pages).

3GPP TS 36.321 V12.4.0; "3rd Generation Partnership Project; Technical Specification Group Radio Access Network; Evolved Universal Terrestrial Radio Access (E-UTRA); Medium Access Control (MAC) protocol specification (Release 12)"; Dec. 2014 (60 pages).

\* cited by examiner

USER APPARATUS AND TIMER CONTROL METHOD

BACKGROUND OF THE INVENTION

1. Field of the Invention

The present invention relates to a timer control method in a mobile communication system such as an LTE system.

2. Description of the Related Art

Carrier aggregation (CA) is adopted in an LTE system. In the carrier aggregation, communications are performed, by having a predetermined bandwidth as a basic unit, by using a plurality of carriers at the same time (Non-Patent Document 1). The carrier as a basic unit in the carrier aggregation is referred to as a component carrier (CC).

When CA is performed, a primary cell (PCell) with high reliability for securing connectivity and a secondary cell (SCell) are set (configured) for a user apparatus UE. The user apparatus UE is first connected to a PCell, and, if necessary, an SCell can be added. The PCell is the same as a single cell which supports radio link monitoring (RLM) and semi-persistent scheduling (SPS), etc.

Adding and removing of an SCell is performed by using radio resource control (RRC) signaling. Right after an SCell is configured for the user apparatus UE, the SCell is in a deactivated state. The SCell becomes a cell capable of communications (capable of scheduling) only when it is activated.

CITATION LIST

Non-Patent Literature

[Non-Patent Literature 1] 3GPP TS 36.300 V12.4.0 (2014-12)
[Non-Patent Literature 2] 3GPP TS 36.321 V12.4.0 (2014-12)
[Non-Patent Literature 3] 3GPP TS 36.211 V12.4.0 (2014-12)

SUMMARY OF THE INVENTION

Technical Problem

In the existing LTE, as a radio frame structure, it is defined that 1 radio frame is 10 ms, 1 subframe is 1 ms, 1 slot is 0.5 ms (Non-Patent Literature 3). One subframe corresponds to a transmission time interval (TTI) which is a minimum unit of scheduling. In other words, for each subframe, a resource block (RB) is assigned to a user apparatus UE selected in the scheduling of the base station eNB. One RB includes, for example, 12 subcarriers in the frequency direction (subcarriers of OFDM) and 7 symbols in the time direction (symbols of OFDM).

It should be noted that in the 3rd generation partnership project (3GPP), it is planned that the standardization of the fifth generation wireless technology (hereinafter, referred to as "5G") will be started from Release 14 (Rel-14) or later. In 5G, in order to reduce radio communication delay, it has been investigated, for example, to reduce 1 TTI to 0.1 ms.

Further, as a 5G deployment scenario, a scenario has been investigated in which CA is provided by having an LTE cell as a base and having a 5G cell overlaid. An example of the above deployment scenario is illustrated in FIG. 1. As illustrated in FIG. 1, an LTE cell as a macro cell is formed by a base station eNB, a 5G cell as a small cell is formed by, for example, remote radio equipment (RRE) extended from the base station eNB, and a user apparatus UE performs high-throughput communications by using CA provided by the LTE cell and the 5G cell.

In a mobile communication system such as an LTE system, many operations are controlled based on timers. A timer used for controlling a cell is based on a TTI unit of the cell. Therefore, in the case of the above system including an LTE cell and a 5G cell, it is expected that the operations are controlled based on timers based on individual TTIs. In other words, as illustrated in FIG. 2, operations are controlled based on timers of 1 ms unit in an LTE cell whose TTI is 1 ms, and operations are controlled based on timers of 0.1 ms unit in a 5G cell whose TTI is 0.1 ms.

In LTE-5G CA, regarding the timers related to controlling operations in cells, it is expected that the timers will be operated independently based on the corresponding TTI units of the cells. However, regarding the timer used for an individual user apparatus UE (common for all serving cells), it is unknown which TTI should be used as a unit time for timer control operations. For example, a DRX related timer and a measurement gap are applied to all cells. In this case, it is unknown which TTI should be used as a unit time for timer control operations. Further, in the case where receiving random access (RA) response (RAR) for SCell PRACH is performed by a PCell by using an RA window of the PCell, it is unknown which TTI should be used as a unit time for timer control operations.

There is an idea in which it is up to UE implementation which TTI is used for the timer control operations. However, in such a case, depending on the UE implementation, a timer may expire quickly, or, a timer may expire slowly, and thus, the same level of performance cannot be guaranteed for all UEs, which is a problem.

In view of the above, an object of the present invention is to provide a technique in which it is possible, in a mobile communication system which supports carrier aggregation including a plurality of cells with different TTIs, to appropriately determine the TTI used as a reference for timer control operations of a user apparatus.

Solution to Problem

According to an embodiment of the present invention, a user apparatus is provided. The user apparatus performs communications with a base station in a mobile communication system which includes a plurality of cells including a first cell and a second cell which uses a TTI different from the TTI of the first cell. The user apparatus includes a communication unit configured to transmit and receive a signal to and from the base station; and a timer control unit configured to, according to a type of a control operation performed by the communication unit, determine a TTI used as a unit time for operating a timer for the control operation. The communication unit performs the control operation by operating the timer by using as a unit time the TTI determined by the timer control unit.

Further, according to an embodiment of the present invention, a timer control method is provided. The timer control method is performed by a user apparatus which performs communications with a base station in a mobile communication system which includes a plurality of cells including a first cell and a second cell which uses a TTI different from the TTI of the first cell. The timer control method includes, according to a type of a control operation performed by a communication unit, determining a TTI used as a unit time for operating a timer for the control operation, and performing the control operation by operating the timer by using as a unit time the determined TTI.

Advantageous Effects of Invention

According to an embodiment of the present invention, it is possible, in a mobile communication system which supports carrier aggregation including a plurality of cells with different TTIs, to appropriately determine the TTI used as a reference for performing a timer control operation of a user apparatus.

DETAILED DESCRIPTION OF THE PREFERRED EMBODIMENTS

Figure 1:
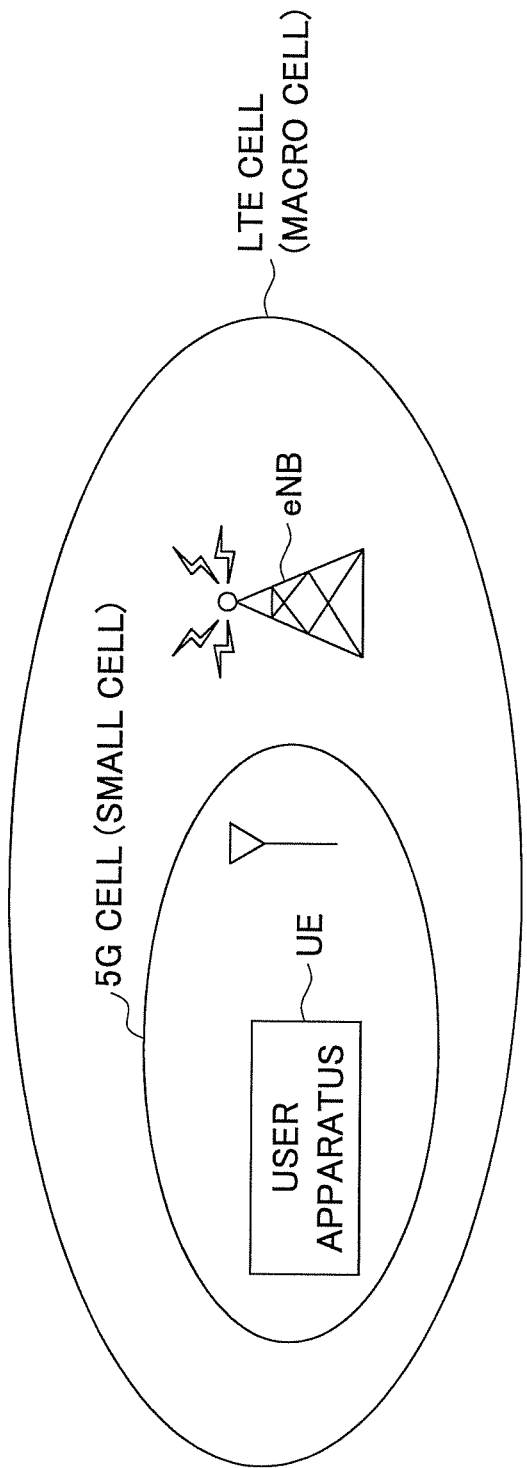
FIG. 1 is a drawing illustrating an example of a case in which an LTE cell is used as a macro cell and a 5G cell is used as a small cell.

In the following, referring to the drawings, embodiments of the present invention will be described. It should be noted that the embodiments described below are merely examples and the embodiments to which the present invention is applied are not limited to the following embodiments.

In an embodiment, a mobile communication system is provided which is capable of performing carrier aggregation (CA) including a cell of LTE and a cell of 5G as illustrated in, for example, FIG. 1. However, application of the present invention is not limited to LTE and 5G. The present invention can be applied to other radio access technologies (RAT) which are capable of providing carrier aggregation.

Further, a technique according to an embodiment can be applied, not only to an intra eNB CA including a single base station eNB, but also to an inter eNB CA including a plurality of base stations (MeNB, SeNB, etc.) of dual connectivity, etc. In other words, carrier aggregation (CA) described in the specification and in claims includes the intra eNB CA and the inter eNB CA.

Further, a "cell" which is included in CA is a cell in which the user apparatus UE resides, and may be referred to as a serving cell. As an example, the "cell" which is included in CA includes only downlink CC, or includes downlink CC and uplink CC. Further, it is assumed that 3GPP specifications of "LTE" corresponding to the present application specification and claims may be, but not limited to, any release as long as CA is introduced in the release.

(Overall System Configuration)

Figure 3:
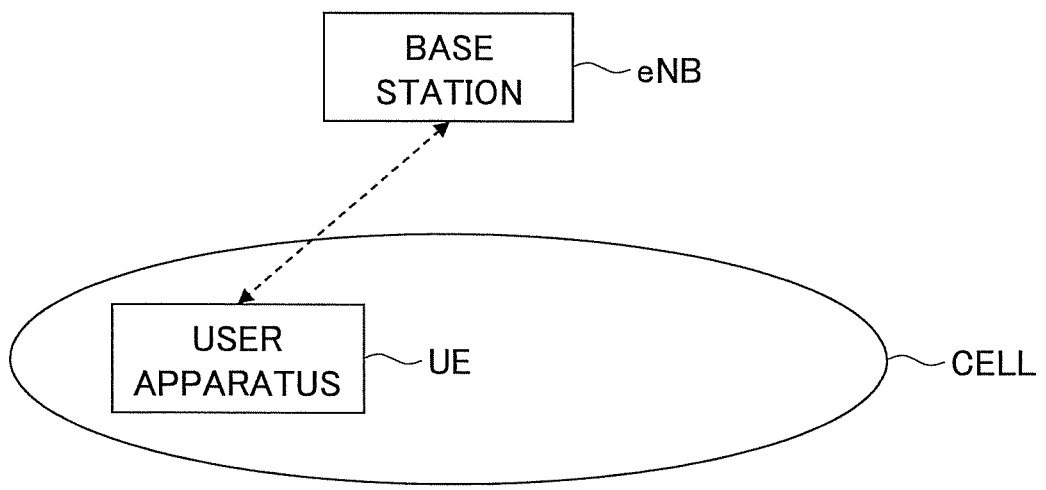
FIG. 3 is a configuration diagram of a communication system according to an embodiment of the present invention.

FIG. 3 illustrates a configuration diagram of a communication system according to an embodiment of the present invention. As illustrated in FIG. 3, the communication system is a mobile communication system including a base station eNB and a user apparatus UE. It is possible for the base station eNB and the user apparatus UE to perform LTE-5G CA communications. In FIG. 3, for the sake of convenience, a single base station eNB and a single user apparatus UE are illustrated. Multiple base stations eNB and multiple user apparatuses UE may exist. Further, in an embodiment, it is assumed that the similar control operation is performed in 5G as defined in LTE.

In LTE-5G CA, a TTI (a TTI length) is 1 ms in a LTE cell, and 0.1 ms in 5G. It should be noted that "TTI of a 5G cell=0.1 ms" is only an example. The TTI of a 5G cell may be another TTI shorter than the TTI of LTE. In the following, in order to distinguish between a "subframe" in LTE and a "subframe" in 5G, the subframe in LTE (=TTI of LTE) is referred to as "LTE subframe" and the subframe in 5G (=TTI of 5G) is referred to as "5G subframe". It should be noted that, in the case where it is not necessary to distinguish LTE/5G, in the case where it is obvious which of LTE/5G is referred to, etc., "subframe" may be used. Further, according to an embodiment, when LTE-5G CA is provided for a user apparatus UE, as an example, a PCell is provided by an LTE cell and a SCell is provided by a 5G cell.

In an example of FIG. 3, a single cell is indicated for the sake of convenience. When CA is provided, multiple cells exist. Further, for example, one or more RRE (remote radio equipment) sets connected to the base station eNB via an optical fiber, etc., may be included at a location away from the eNB. In a system configuration in which the RRE is included, for example, a macro cell is formed by a PCell, a small cell is formed by an SCell under the RRE, and a user apparatus UE residing in the small cell performs high-throughput communications by using CA. Further, the macro cell and the small cell may include a MeNB and a SeNB by using dual connectivity.

(Timer Determination Operation Example)

Figure 2:
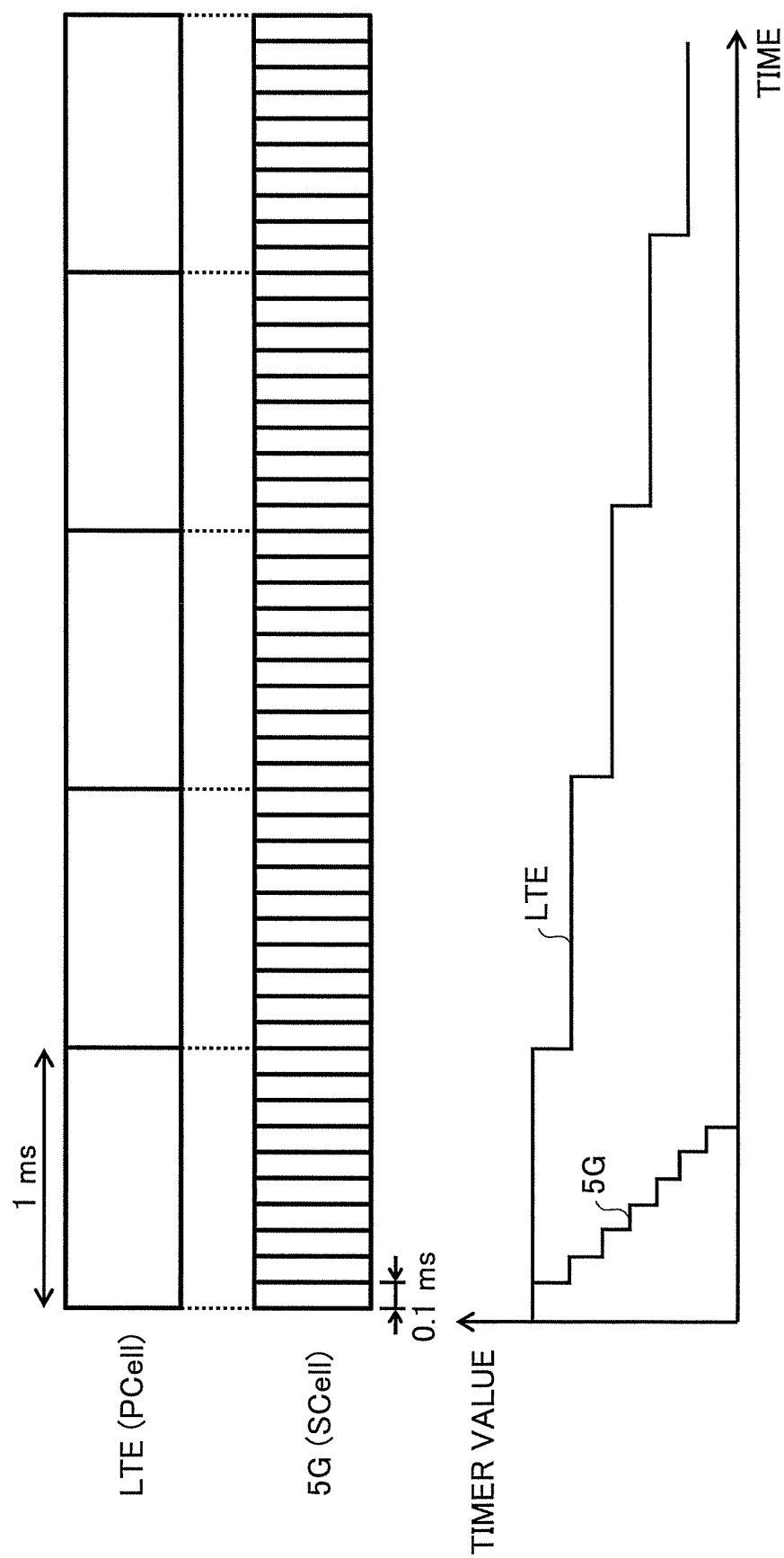
FIG. 2 is a drawing illustrating a problem.

According to an embodiment, as illustrated in FIG. 2, in the case where the user apparatus UE performs cell-specific control operations, the user apparatus UE performs timer control operations for an LTE cell by using an LTE TTI as a unit, and performs timer operations for a 5G cell by using a 5G TTI as a unit. On the other hand, in the case of operations related to a plurality of cells included in CA, or in the case of the above described RA procedure, it will be determined which TTI is used as a unit for performing timer control operations, and thus, the above described problem will be solved.

As an example, there is an idea in which it is defined to use one TTI as a reference for both cells. For example, based on a shorter TTI, timer control operations are performed for an LTE cell and a 5G cell, or, based on a longer TTI, timer operations are performed for an LTE cell and a 5G cell. The user apparatus UE and the base station eNB perform timer control operations according to the above definition. It should be noted that, in the case where operations are performed among cells with three or more different TTIs, for example, it is possible to use the longest TTI as the longer TTI and the shortest TTI as the shorter TTI.

By using the longer TTI, that is, by using the LTE-TTI according to an embodiment, for performing timer control operations, the operations are performed with coarse control, a sufficient scheduling timing is secured, and connectivity and throughput will be improved. Further, by using the shorter TTI, that is, by using the 5G-TTI for performing timer operations, the operations are performed with fine control, and battery saving effect will be obtained.

Further, for example, a TTI corresponding to a PCell may be used as a reference for timer control operations. By performing timer control operations based on the TTI corresponding to the PCell used for securing connectivity between the UE and the eNB, operations for the PCell can be optimized and the connectivity can be secured.

It should be noted that, only in the case where a timer operating with an LTE-TTI and a timer operating with a 5G-TTI are included in a user apparatus UE and both timers are running, it may be determined that the timer is running for the user apparatus UE. Further, in the case where a timer operating with an LTE-TTI and a timer operating with a 5G-TTI are included in a user apparatus UE and one of the timers is running, it may be determined that the timer is running for the user apparatus UE.

As described above, it is possible to define a single TTI used as a unit time for performing timer control operations for individual user apparatuses UE (regardless of type of operations). However, depending on the types of the target timer control operations and network (NW) policies, there is a case where a longer TTI is more appropriate, or where a shorter TTI is more appropriate. Therefore, regarding the TTI used as a reference for timer control operations, the user apparatus UE (and the base station eNB) may determine the TTI used as a reference based on the type of operation.

In the following, an example will be described in the case where the TTI used as a reference is determined based on the type of a timer control operation. Here, determining a TTI used as a reference for performing timer control operations means determining the TTI used as a unit time for the timer control operations.

Example 1: DRX Control Operation

First, as an example 1, a discontinuous reception (DRX) control operation will be described. The DRX control operation is a discontinuous reception control operation aiming at power consumption reduction of a user apparatus UE. Further, the DRX control operation is provided for individual user apparatuses UE. As a basic operation in the DRX control, the user apparatus UE, upon receiving a PDCCH indicating UL/DL data transmission allocation for the user apparatus UE, starts a timer (drx-Inactivity Timer), then, goes into a DRX state when the timer has expired without receiving a PDCCH for the user apparatus UE, and repeats alternately, at a predetermined cycle (DRX-Cycle), an active state in which a PDCCH is monitored and an inactive state in which a PDCCH is not monitored. A period of an active state in the DRX state is measured by an onDurationTimer.

Figure 4:
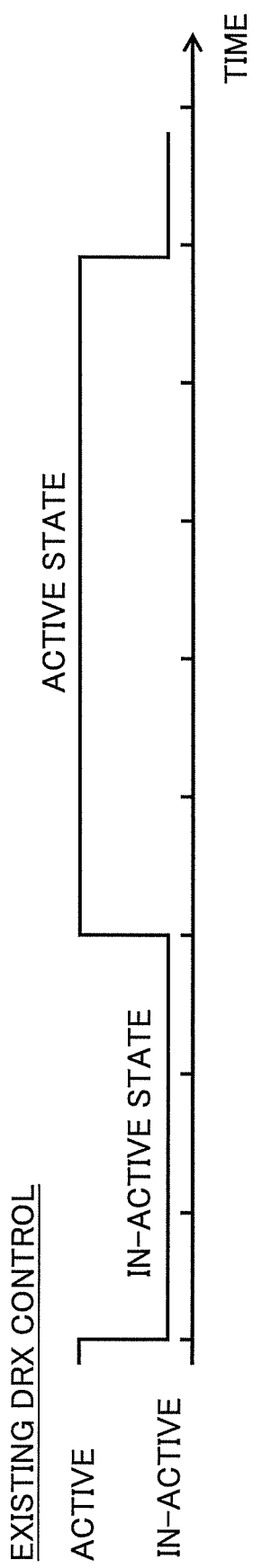
FIG. 4 is a drawing illustrating a DRX control.

In other words, the onDurationTimer is started at the beginning of the DRX Cycle, and, if a PDCCH is not received before the onDurationTimer expires, then the user apparatus UE goes into an inactive state at the time when the onDurationTimer expires. FIG. 4 illustrates examples of an active state and an inactive state.

In the example 1, the user apparatus UE performs timer control operations based on, for example, a shorter TTI. In other words, when LTE-5G CA is performed, timer control operations based on a 5G-TTI are performed. In this case, the user apparatus UE is configured in such a way that the user apparatus UE performs timer control operations based on the 5G-TTI when the user apparatus UE performs DRX control operations. For example, in the case where a timer value for the DRX control operation is specified by the number of subframes, the user apparatus performs the timer control operation based on a 5G subframe (5G-TTI).

Figure 5:
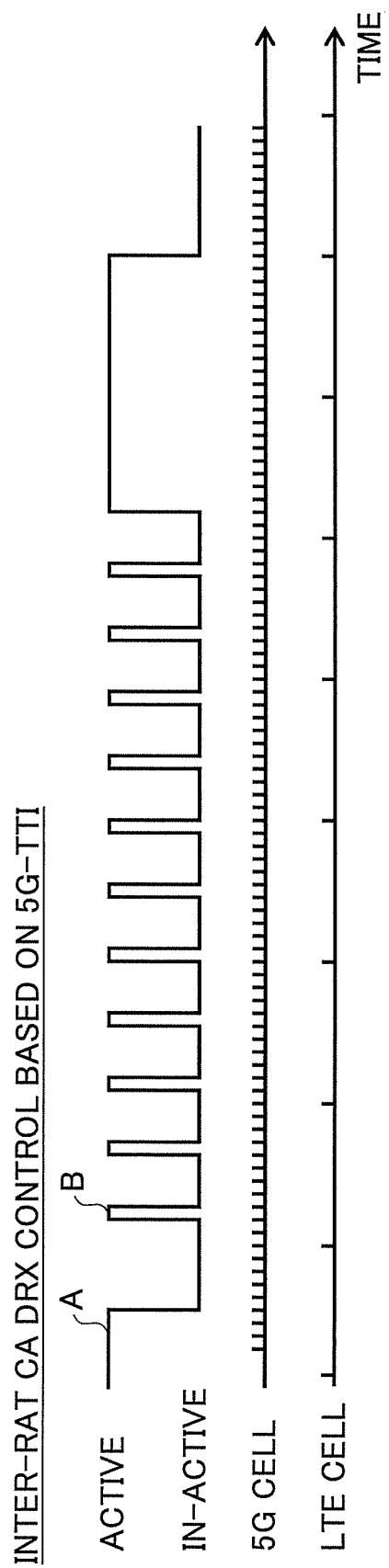
FIG. 5 is a drawing illustrating an Inter-RAT CA DRX control based on a 5G-TTI.

FIG. 5 illustrates an example in the case where the DRX timer control operation is performed based on the 5G-TTI. In this case, for example, the user apparatus UE goes into a DRX state at time A, and performs timer control operations by using a 5G-TTI unit. For example, the user apparatus UE becomes an active (on duration) state at time B. Here, a PDCCH is monitored during one 5G subframe amount according to an on duration timer, a PDCCH for the user apparatus UE is not received, and thus, the user apparatus UE goes into an inactive state.

As described above, it is possible to achieve more flexible battery saving by having the user apparatus UE transitioning between an active state and an inactive state with fine control based on a shorter TTI.

Further, in the example 1, the user apparatus UE may perform timer control operations based on a longer TTI. In other words, when LTE-5G CA is performed, timer control operations based on an LTE-TTI are performed. In this case, the user apparatus UE is configured in such a way that the user apparatus UE performs timer control operations based on the LTE-TTI when the user apparatus UE performs DRX control operations. For example, in the case where a timer value for the DRX control operation is specified by the number of subframes, the user apparatus performs the timer control operation based on an LTE subframe.

Figure 6:
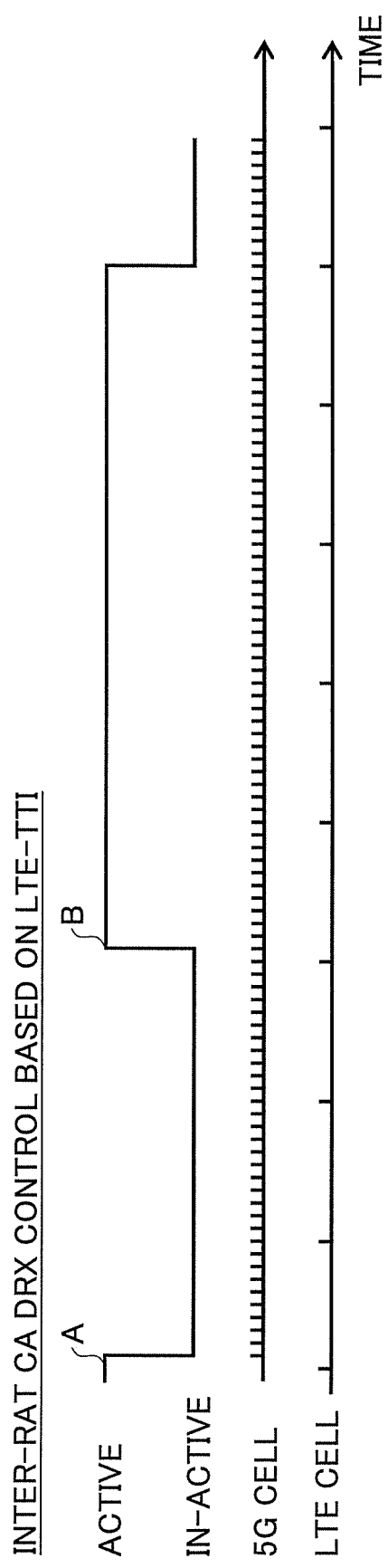
FIG. 6 is a drawing illustrating an Inter-RAT CA DRX control based on an LTE-TTI.

FIG. 6 illustrates an example in the case where the DRX timer control operation is performed based on the LTE-TTI. In this case, for example, the user apparatus UE goes into a DRX state at time A, and performs timer control operations by using an LTE-TTI unit. For example, the user apparatus UE becomes an active (on duration) state at time B. Here, a PDCCH is monitored during a five LTE subframe amount according to an on duration timer, a PDCCH for the user apparatus UE is not received, and thus, the user apparatus UE goes into an inactive state.

As described above, by performing timer control operations based on the longer TTI, it is possible to increase interoperability with LTE cells and avoid complicated implementation of the apparatus.

Further, regarding the configurations of the user apparatus UE described above, in the case where the configuration is defined, for example, in the standard specification, the defined configuration may be set in advance. Further, regardless whether which configuration is defined in the standard specification, the base station eNB may instruct the user apparatus UE to perform the DRX timer control operation based on the LTE-TTI or the 5G-TTI, and the user apparatus UE may be configured according to the instruction. For example, in a network with a policy emphasizing the battery saving of the user apparatus UE, the timer control operation based on the 5G-TTI may be instructed. Further, in a network with a policy emphasizing the control simplicity, the timer control operation based on the LTE-TTI may be instructed.

Regarding the instruction from the base station eNB to the user apparatus UE, for example, an RRC signal or a MAC signal may be used together with parameters such as a timer value related to the DRX control operations. The operations based on the instruction from the base station eNB to the user apparatus UE (not limited to the DRX control operations) will be described later by referring to a sequence diagram.

Example 2: RA Response Window

In LTE, when the user apparatus UE accesses a cell, for example, when uplink transmission data is generated in the user apparatus UE while there is no uplink transmission resources (uplink out of synchronization), etc., the user apparatus UE performs a random access (RA) procedure (Non-Patent Literature 2).

In the RA procedure, the user apparatus UE transmits an RA preamble to the base station eNB via a PRACH, and receives from the base station eNB an RA response (hereinafter, referred to as RAR) including transmission timing information, allocation information, etc., via a PDCCH.

After transmitting the RA preamble, the user apparatus UE monitors the RAR during only a period of a RA response window. Specifically, the user apparatus UE monitors the RAR by checking whether an RAR including an identifier of the user apparatus UE (RA-RNTI) is received. The RA response window is, for example, a period which starts from a subframe including the end of the RA preamble transmission+three subframes, and has a length of the amount of the number of subframes indicated by a value of "ra-ResponseWindowSize".

The user apparatus UE, for example, starts a timer corresponding to the ra-ResponseWindowSize at the beginning of the RA response window, and detects the end of the RA response window from the expiration of the timer. In the case where the RAR is not received within the RA response window, the user apparatus UE determines that the RA procedure has failed. Afterwards, the user apparatus UE retransmits the RA preamble.

According to an embodiment, the user apparatus UE (the same applies to the base station eNB) performs a timer control operation of the RA response window based on the TTI of a cell via which the user apparatus UE receives the RAR. For example, in the case where the user apparatus UE transmits an RA preamble via a PCell (in this example, an LTE cell) in order to perform UL synchronization with the PCell, the user apparatus UE receives the RAR via the PCell. Therefore, in this case, the user apparatus UE determines to use the LTE-TTI as a unit time for timer control operations, and performs the timer control operation related to the RA response window based on the LTE-TTI. For example, in the case where the value of ra-ResponseWindowSize is 5, the user apparatus UE starts a timer at the beginning of the RA response window, and detects the end of the RA response window from the expiration of 5 times an LTE subframe period.

Further, for example, in the case where the user apparatus UE transmits an RA preamble via a SCell (in this example, a 5G cell) in order to establish UL synchronization with the SCell and receives a RAR via a PCell (an LTE cell), the user apparatus UE determines to use the LTE-TTI as a unit time for timer control operations, and performs the timer control operation related to the RA response window based on the LTE-TTI.

Further, in the case where the user apparatus UE transmits an RA preamble via a SCell and receives a RAR via the SCell (5G cell), the user apparatus UE performs a timer control operation related to the RA response window based on the 5G-TTI.

The RA response window is used for increasing opportunities for the user apparatus UE to receive a RAR via the cell (the cell via which the user apparatus receives the RAR). Therefore, as described above, the TTI used as a scheduling unit of the cell for receiving a RAR is used as a reference of the RA response window. In the case where a RAR is received via the LTE cell, if the 5G-TTI is used as a unit time for timer control operations of the RA response window, then, compared with the scheduling period in the LTE cell, the RA response window becomes shorter and there is an increased possibility that the RAR cannot be received when the LTE cell is congested just a little. On the other hand, in the case where a RAR is received via the LTE cell, if the LTE-TTI is used as a unit time for timer control operations of the RA response window, then, even when the LTE cell is congested a little, there is an increased possibility that the RAR can be received during a period of the RA response window which includes multiple LTE-TTIs.

Further, in the case where an RAR is received via the 5G cell, if the LTE-TTI is used as a unit time for timer control operations of the RA response window, then, there is a possibility that the RA response window has a wastefully long period in the 5G cell which is capable of performing communications in a short period with higher throughput than the LTE cell, and thus, the high speed advantages of 5G are not utilized. On the other hand, in the case where an RAR is received via the 5G cell, if the 5G-TTI is used as a unit time for timer control operations of the RA response window, then, the RAR control operation is performed in a short period, and thus, the advantages of 5G can be utilized.

Figure 7:
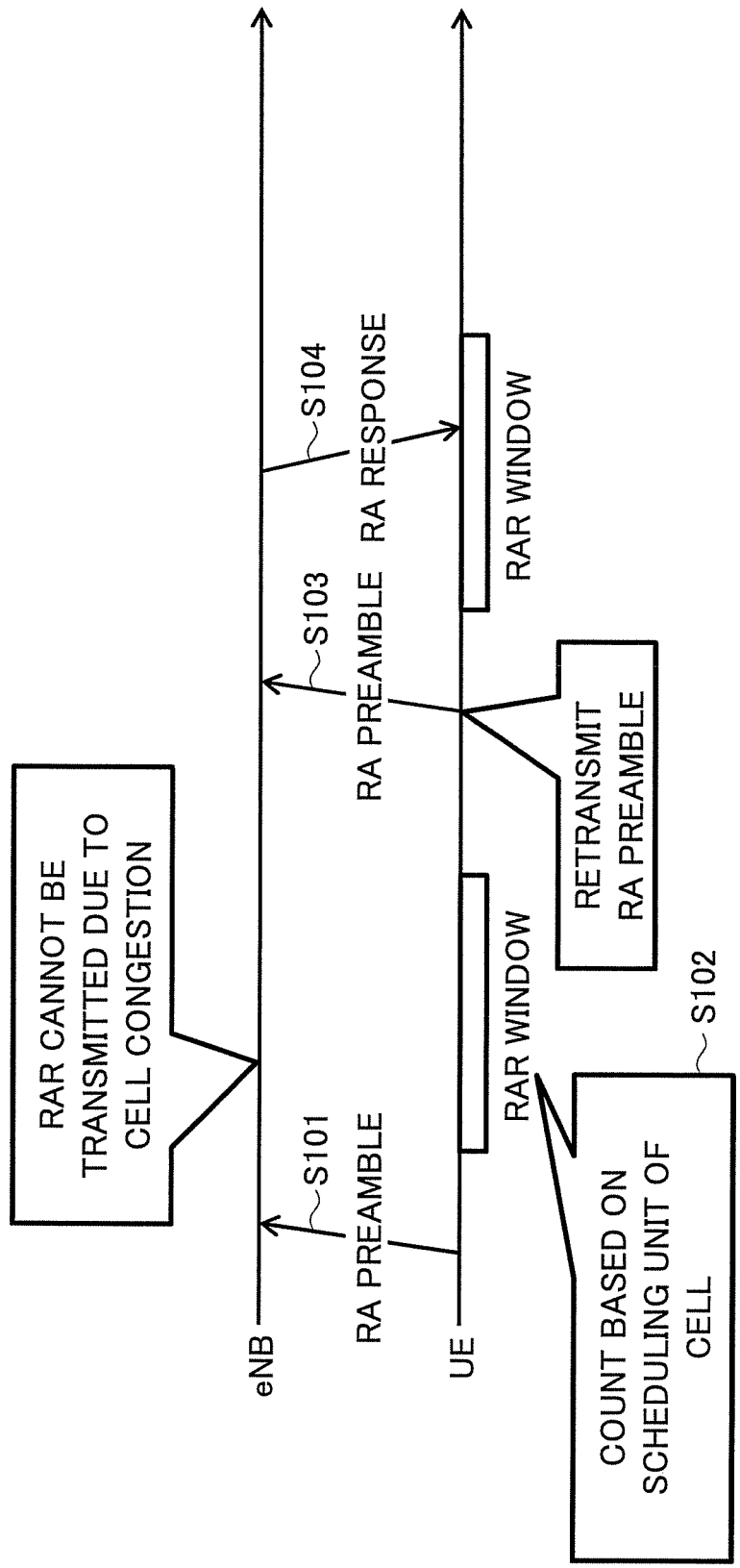
FIG. 7 is a drawing illustrating a timer control example of an RA response window.

FIG. 7 illustrates an example of an RA procedure. In this example, the user apparatus UE first transmits an RA preamble (Step 101). According to a timer control operation based on a TTI of a cell (e.g., PCell) via which an RAR is to be received, the user apparatus UE calculates an RA response window period, and monitors the RAR during the period (Step 102). However, at this time, the cell is congested, and the user apparatus UE is unable to receive an RAR during the RA response window period.

As a result, the user apparatus UE retransmits the RA preamble (step 103). It is expected that the cell is still congested. However, because the RA response window period has been calculated based on the TTI unit of a cell via which an RAR is to be received, there are sufficient opportunities to receive an RAR via the cell, and here, in step 104, the user apparatus UE is able to receive an RAR.

An operational condition, which indicates that the TTI of a cell via which an RAR is to be received is used for the timer control operation of the RA response window, may be set in the user apparatus UE in advance, or may be set in the user apparatus UE according to an instruction from the base station eNB.

Example 3: Measurement Gap

In LTE (here, also in 5G), in the case where CA is provided, a measurement control operation is performed from the mobility related handover and cell (CC) addition/removal point of view. In the measurement control operation, a measurement instruction (measurement configuration) is transmitted from the base station eNB to the user apparatus UE, the user apparatus UE performs, for example, measurement of a measurement-instructed cell (frequency) according to the measurement instruction, and transmits a measurement result as a measurement report to the base station eNB based on a predetermined condition (based on a event, periodically, etc.)

Regarding a neighbor cell whose frequency is the same as a cell the user apparatus UE is communicating with (serving cell), the user apparatus UE can perform the measurement without using a measurement gap. However, when the user apparatus UE performs the measurement of a neighbor cell whose frequency is different from the serving cell, it is necessary to use the measurement gap.

During the measurement gap period, the base station eNB and the user apparatus UE do not perform transmission and reception via the serving cell. The user apparatus UE performs signal measurement (e.g., RSRP, RSRQ) at a frequency of the neighbor cell during the measurement gap period. A measurement gap configuration (measurement gap starting position, measurement gap length, gap repetition cycle, etc.) may be, for example, transmitted from the base station eNB to the user apparatus UE via an RRC signal.

The measurement gap, which is used for measuring a frequency different from the serving cell, is applied to an LTE cell and a 5G cell, that is, applied to individual user apparatuses UE. In an embodiment, the timer control operation is performed based on a longer TTI.

Figure 8:
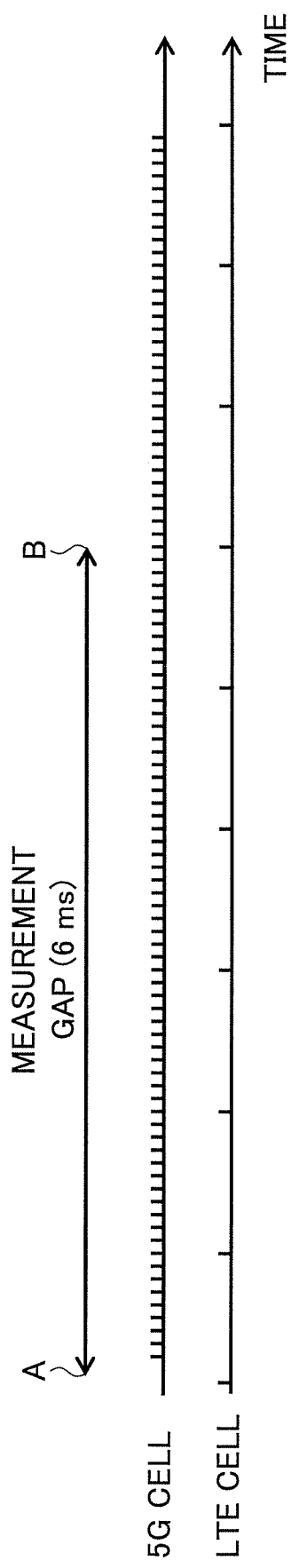
FIG. 8 is a drawing illustrating a timer control example of a measurement gap.

In other words, as illustrated in FIG. 8, in LTE-5G CA, the measurement gap is calculated by using as a unit time the TTI of the LTE cell. It should be noted that FIG. 8 illustrates a case where the measurement gap length is 6 ms, which is a current LTE measurement gap length. In an example of FIG. 8, for example, based on the measurement gap configuration information, when the beginning of the measurement gap using the LTE subframe as a reference, indicated by "A", is detected, the user apparatus UE starts a timer in which a timer value corresponding to the measurement gap length (e.g., 6 times LTE-TTI) is set. The timer is gradually decreased by units of the LTE-TTI (LTE subframe). When the timer expires (at the time indicated by "B" in FIG. 8), the user apparatus UE determines that the measurement gap has ended, and starts communications via the serving cell (LTE, 5G). The similar control operation is also performed by the base station eNB. Further, regarding the repetition period of the measurement gap (e.g., 40 ms period, 80 ms period), the period may be measured according to the timer control operation based on the LTE-TTI.

In order to secure sufficient measurement accuracy, it is considered that a sufficient measurement period is needed and that control operations in which the measurement gap is started and ended with fine control based on a short TTI is not so needed. Therefore, in an embodiment, the timer control operation of the measurement gap is performed based on the long TTI.

In the timer control operation of the measurement gap, an operational condition of using a long TTI may be set in the user apparatus UE in advance, or may be set in the user apparatus UE according to an instruction from the base station eNB.

Example 4: DL Quality Monitoring Timer

In LTE (here, also in 5G), for example, the user apparatus UE in an RRC idle state periodically measures reception quality (e.g., RSRP, RSRQ) of a currently residing cell (serving cell), and, when the reception quality (may also be referred to as DL quality or DL radio quality) becomes lower than a predetermined threshold value, starts measurement of reception quality of a neighbor cell. More specifically, the user apparatus UE performs symbol/frame synchronization, performs obtaining a cell ID (PCI), etc., by receiving a synchronization signal (PSS/SSS) of the neighbor cell, and performs reception quality measurement by receiving a reference signal.

Further, for example, in the case where the reception quality of the serving cell becomes lower than the reception quality of the neighbor cell by equal to or more than a predetermined value, the user apparatus UE transitions to (camps on) the neighbor cell. When the user apparatus UE camps on the cell, the user apparatus UE monitors broadcast information (system information), etc., of the cell.

It should be noted that, because there are microscopic fluctuations in the reception quality, if the cell transition is performed in the case where the above condition is met even for a moment, then a ping-pong state occurs in which the user apparatus UE repeatedly transitions between the cells. Therefore, the user apparatus performs the cell transition in the case where the user apparatus UE monitors the reception quality of the serving cell and the neighbor cell for a certain period, and the transition condition has been met for a predetermined period.

Figure 9:
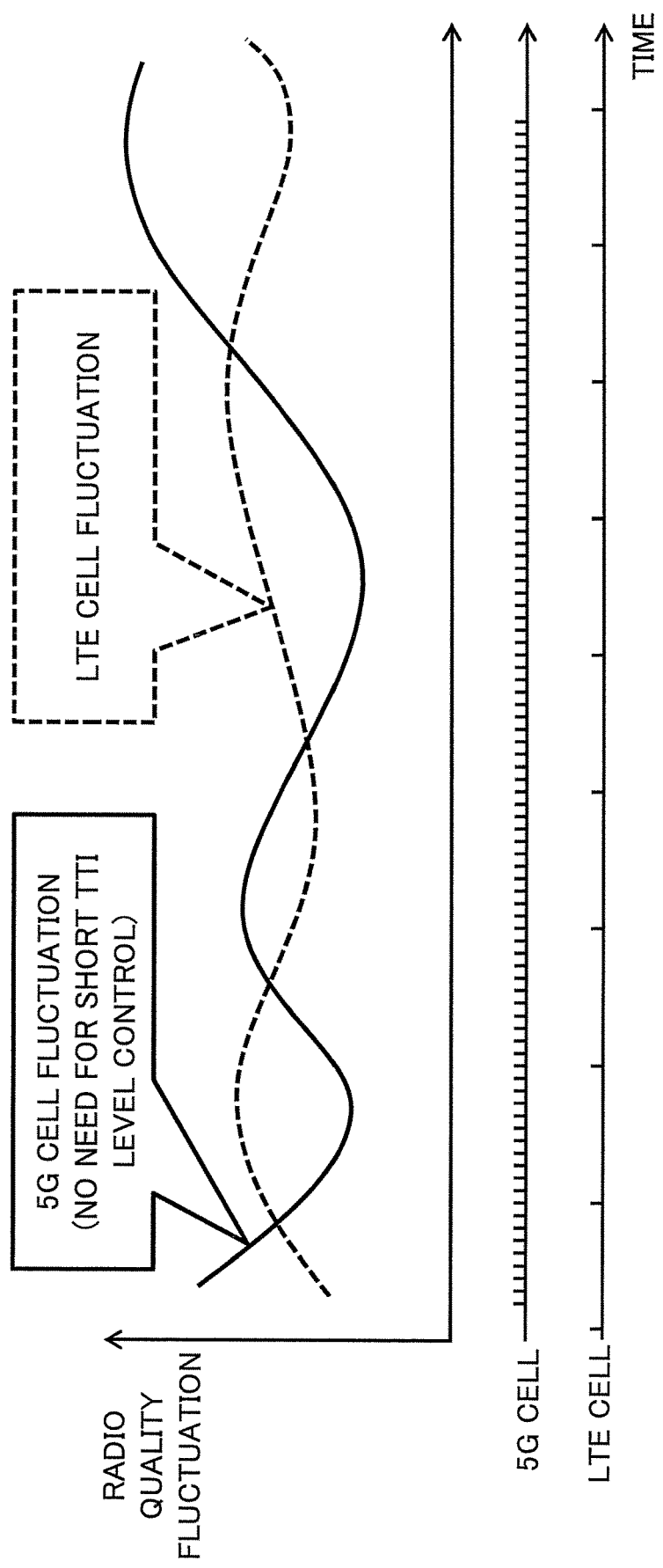
FIG. 9 is a drawing illustrating a control example of a DL quality management timer.

In an example 4, a timer for measuring the predetermined period is referred to as a DL quality monitoring timer. An image of radio quality fluctuations in the 5G cell and the LTE cell is illustrated in FIG. 9. As illustrated in FIG. 9, the radio quality fluctuations are slow with respect to the 5G-TTI in the case of the 5G cell and in the case of the LTE cell. Therefore, in this example, in order to suppress occurrence of a ping-pong state, the DL quality monitoring timer is controlled based on the longer TTI.

As an operational example, it is assumed that, for example, there are 5G small cells distributed in an LTE macro cell, the user apparatus UE measures reception quality of a 5G cell as a serving cell and measures reception quality of another 5G cell as a neighbor cell, and as a result, the condition for transitioning to the neighbor cell is met with respect to the reception quality. The user apparatus UE includes a DL quality management timer in which a value of a predetermined number of LTE-TTIs is set as a timer value, and starts the DL quality management timer at the time when the above condition is met. The user apparatus UE continues measuring the 5G cells at a predetermined period while the DL quality management timer is running, and as a result, detects that the DL quality management timer expires while the condition is kept being met. The user apparatus UE performs transitioning to the neighbor cell (5G cell) by using the timer expiration as a trigger.

An operational condition of performing the cell transition control operation based on the longer TTI may be set in the user apparatus UE in advance, or may be set in the user apparatus UE according to an instruction from the base station eNB.

(Operation Instruction from Base Station eNB)

Regarding each of the above described control examples, the control method is set in the user apparatus UE in advance, and, based on the control method, the user apparatus UE determines the TTI to be used as a reference for the timer control operation according to a type of a control operation to be performed. Alternatively, the control method may be transmitted from the base station eNB to be set in the user apparatus UE via an RRC signal, etc.

Figure 10:
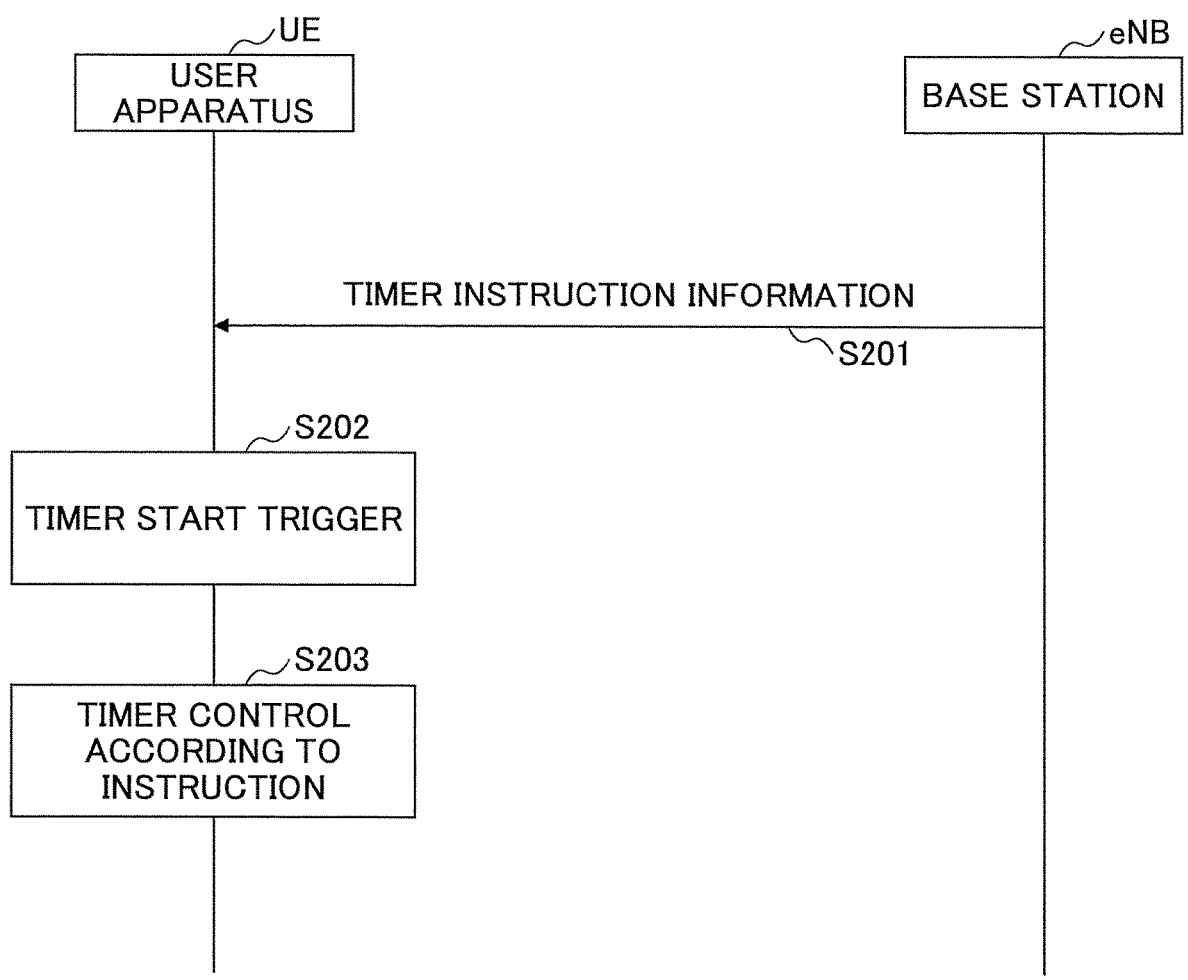
FIG. 10 is a drawing illustrating a sequence example in the case where an instruction is transmitted from a base station eNB to a user apparatus UE.

FIG. 10 illustrates a sequence example of a case where the control method is transmitted from the base station eNB to be set in the user apparatus UE. As illustrated in FIG. 10, the base station eNB transmits to the user apparatus UE timer instruction information as configuration information (step 201). The timer instruction information may indicate which TTIs should be used for corresponding control operations that use timers, or may indicate which TTI should be used for an individual control operation. In the latter case, the timer instruction information may be included in the configuration information of the individual control operation (e.g., DRX configuration, measurement gap configuration).

In step 202, when the user apparatus UE detects a start trigger of a timer (e.g., measurement gap start trigger) in an control operation, the user apparatus UE performs the control operation of the timer based on the TTI according to the instruction information received in step 201 (step 203).

(Apparatus Structure Example)

Next, main configurations of the user apparatus UE and the base station eNB capable of performing all processes described above will be described.

Figure 11:
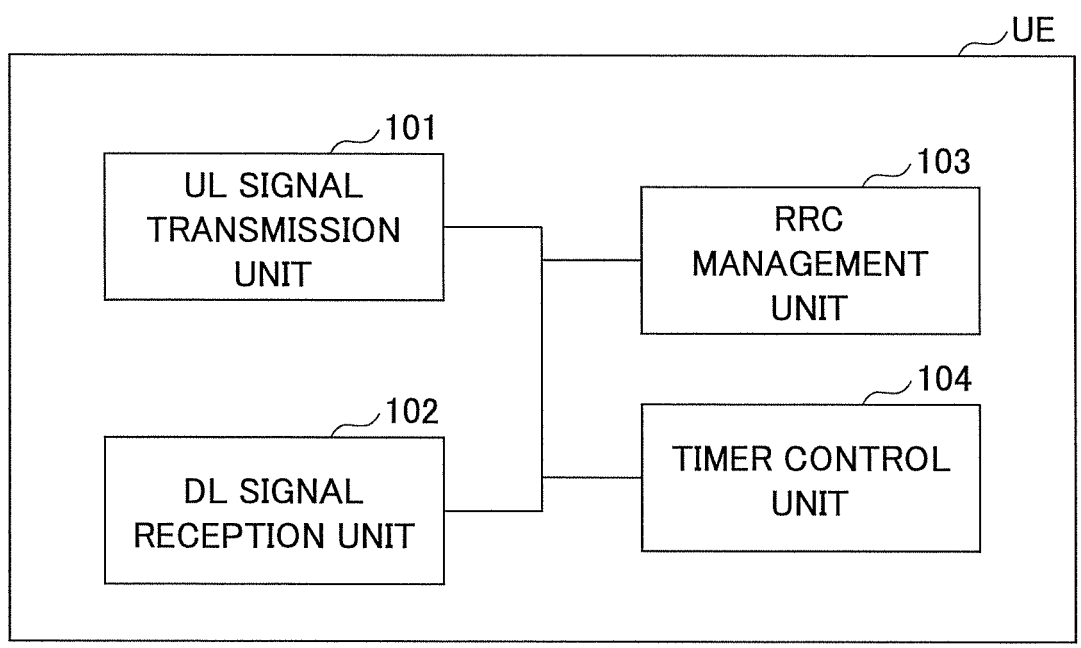
FIG. 11 is a configuration diagram of a user apparatus UE.

FIG. 11 illustrates a functional structure diagram of the user apparatus UE according to an embodiment. As illustrated in FIG. 11, the user apparatus UE includes a UL signal transmission unit 101, a DL signal reception unit 102, an RRC management unit 103, and a timer control unit 104. FIG. 11 illustrates functional units of the user apparatus UE especially related to an embodiment only, and thus, the user apparatus UE further includes at least functions for performing operations according to LTE (not shown in the figure). Further, a functional structure illustrated in FIG. 11 is only an example. Functional classification and names of functional units may be anything as long as operations related to an embodiment can be performed.

The UL signal transmission unit 101 includes a function for wirelessly transmitting various kinds of physical layer signals generated from an upper layer signal which should be transmitted from the user apparatus UE. The DL signal reception unit 102 includes a function for wirelessly receiving various kinds of signals from the base station eNB, and obtaining upper layer signals from the received physical layer signals. Each of the UL signal transmission unit 101 and the DL signal reception unit 102 includes a function for performing CA in which multiple CCs are bundled for communications. Further, the multiple CCs may include CCs of different RATs such as LTE and 5G. As an example, as illustrated in FIG. 1, etc., it is possible for the user apparatus UE to perform CA by having a PCell of LTE and an SCell of 5G.

In an embodiment, basically similar to LTE, processes of layer 1 (PHY), layer 2 (MAC, RLC, PDCP), layer 3 (RRC), etc., are performed in 5G. Each of the UL signal transmission unit 101 and the DL signal reception unit 102 includes a packet buffer, and performs processing of layer 1 (PHY) and layer 2 (MAC, RLC, PDCP). However, the functional structure is not limited to the above. Further, the UL signal transmission 101 and the DL signal reception unit 102 may be included in a single unit referred to as a communication unit. The communication unit includes functions of the UL signal transmission unit 101 and the DL signal reception unit 103. Further, the UL signal transmission unit 101 and the DL signal reception unit 102 include a function for performing a DRX control operation, measurement which uses a measurement gap, an RA procedure, and DL quality monitoring, by operating a timer as described above.

The RRC management unit 103 includes a function for transmitting and receiving an RRC signal to and from the base station eNB, and performing processing of setting/ changing/managing of CA information, configuration change, etc. Further, the RRC management unit 103 may include a function for receiving and retaining timer instruction information (instruction information indicating which TTI should be used as a unit time of a timer operation) from the base station eNB via the DL signal reception unit 102. It should be noted that the above function may be included in a function unit other than the RRC management unit 103 in the user apparatus UE (e.g., the timer control unit 104).

The timer control unit 104 includes a function for determining which TTI should be used as a unit time of a timer operation in each control operation according to own autonomous determination of the user apparatus UE. Further, the timer control unit 104 may determine which TTI should be used as a unit time of a timer operation in each control operation according to the timer instruction information received from the base station eNB and retained by the RRC management unit 103, etc.

In other words, according to a type of a control operation performed by the communication unit (the UL signal transmission unit 101 and the DL signal reception unit 102), the timer control unit 104 determines the TTI to be used as a unit time of a timer operation used for the control operation, and the communication unit performs the control operation by operating the timer by using as a unit time the TTI determined by the timer control unit 104.

It should be noted that it is possible for the timer control unit 104 to, for example, receive from the communication unit an instruction indicating a certain control operation, and transmit to the communication unit the TTI selected based on the received instruction. Further, the timer control unit 104 may be included in the communication unit and the above operation may be performed as an operation in the communication unit.

The structure of the user apparatus UE illustrated in FIG. 11 may be entirely realized by hardware circuit (e.g., one or more IC chips), or may be partially realized by hardware circuit and the remaining part may be realized by a CPU and programs.

Figure 12:
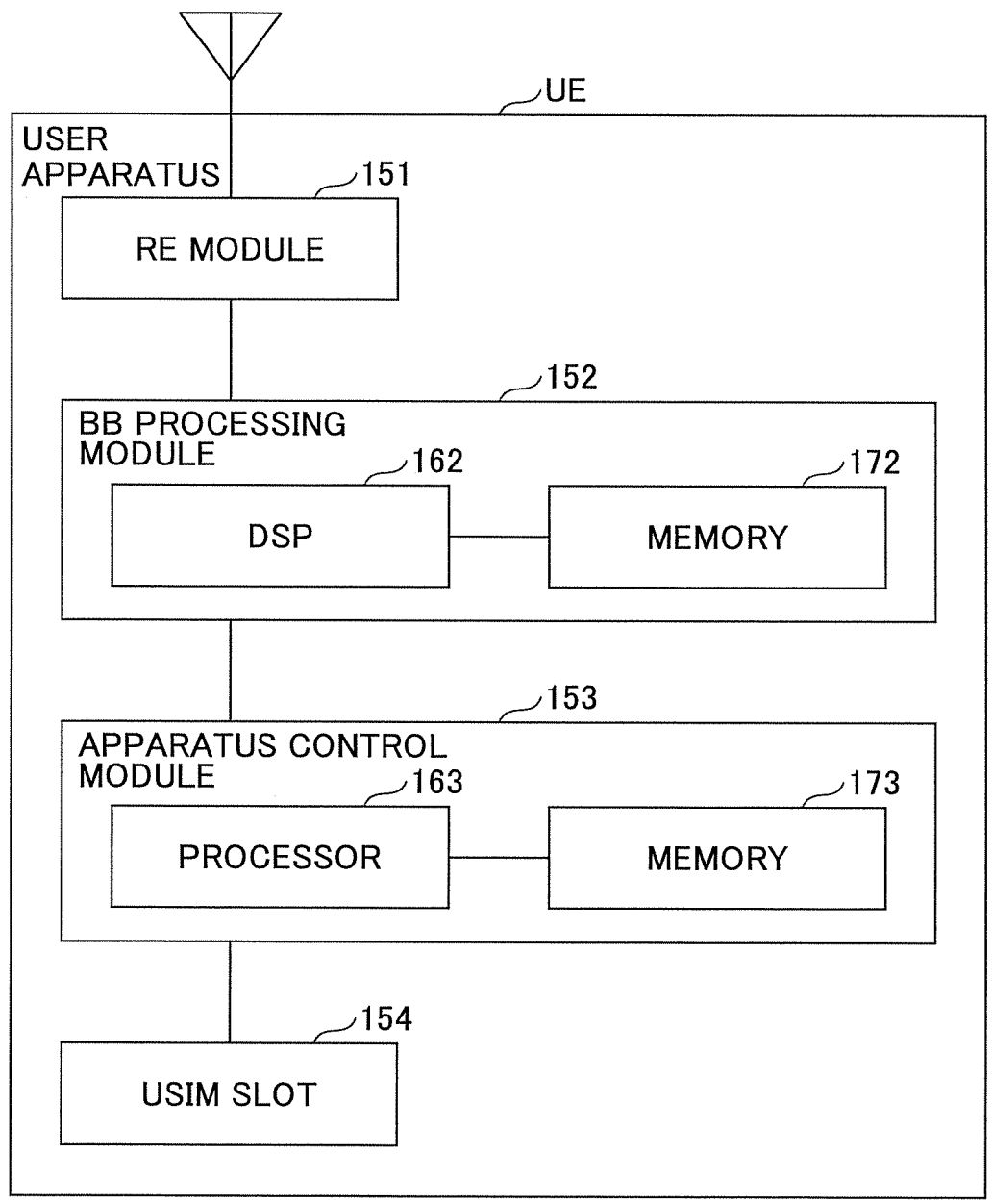
FIG. 12 is a hardware (HW) configuration diagram of the user apparatus UE.

FIG. 12 is a drawing illustrating an example of a hardware (HW) configuration of the user apparatus UE. FIG. 12 illustrates a structure closer to an implementation example compared to FIG. 11. As illustrated in FIG. 12, the user apparatus UE includes a radio equipment (RE) module 151 for performing processing related to a wireless signal, a base band (BB) processing module 152 for performing baseband signal processing, an apparatus control module 153 for performing processing of an upper layer, etc., and a USIM slot 154 which is an interface for accessing a USIM card.

The RE module 151 generates a radio signal to be transmitted from an antenna by performing digital-to-analog (D/A) conversion, modulation, frequency conversion, power amplification, etc., for a digital baseband signal received from the BB processing module 152. Further, the RE module 165 generates a digital baseband signal by performing frequency conversion, analog to digital (A/D) conversion, demodulation, etc., for a received radio signal, and transmits the generated signal to the BB processing module 152. The RE module 151 has, for example, a function of physical layer, etc., in the UL signal transmission unit 101 and the DL signal reception unit 102 illustrated in FIG. 11.

The BB processing module 152 performs processing of converting bidirectionally between an IP packet and a digital baseband signal. A digital signal processor (DSP) 162 is a processor for performing signal processing in the BB processing module 152. A memory 172 is used as a work area of the DSP 162. The BB processing module 152 has, for example, a function of layer 2, etc., in the UL signal transmission unit 101 and the DL signal reception unit 102 illustrated in FIG. 11, and includes the RRC management unit 103 and the timer control unit 104. It should be noted that all or a part of the RRC management unit 103 and the timer control unit 104 may be included in the apparatus control module 153.

The apparatus control module 153 performs processing of IP layer protocol, processing of various types of applications, etc. A processor 163 performs processing for the apparatus control module 153. A memory 173 is used as a work area of the processor 163. Further, the processor 163 reads and writes data from and to the USIM via the USIM slot 154.

Figure 13:
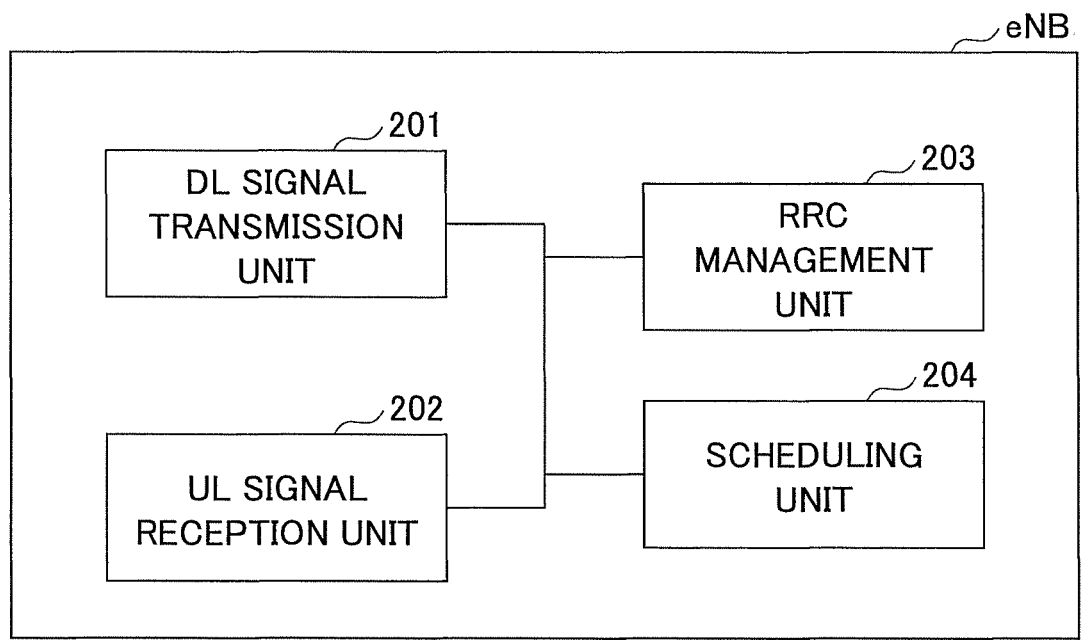
FIG. 13 is a configuration diagram of a base station eNB.

FIG. 13 illustrates a functional configuration diagram of the base station eNB according to an embodiment. As illustrated in FIG. 13, the base station eNB includes a DL signal transmission unit 201, a UL signal reception unit 202, a RRC management unit 203, and a scheduling unit 204. FIG. 13 illustrates functional units of the base station eNB especially related to an embodiment only, and thus, the base station eNB further includes at least functions for performing operations according to LTE (not shown in the figure). Further, a functional structure illustrated in FIG. 13 is only an example. Functional classification and names of functional units may be anything as long as operations related to an embodiment can be performed.

The DL signal transmission unit 201 includes a function for wirelessly transmitting various kinds of physical layer signals generated from an upper layer signal which should be transmitted from the base station eNB. The UL signal reception unit 202 includes a function for wirelessly receiving various kinds of signals from the UEs, and obtaining upper layer signals from the received physical layer signals. Each of the DL signal transmission unit 201 and the UL signal reception unit 202 includes a function for performing CA in which multiple CCs are bundled for communications. Further, the multiple CCs may include CCs of different RATs such as LTE and 5G. As an example, as illustrated in FIG. 1, etc., it is possible for the base station eNB to perform CA by having a PCell of LTE and an SCell of 5G. Further, the DL signal transmission unit 201 and the UL signal reception unit 202 may include a radio communication unit located remotely from the body (control unit) of the base station eNB similar to the RRE.

It is assumed, but not limited, that the DL signal transmission unit 201 and the UL signal reception unit 202 respectively have packet buffers and perform processing of layer 1 (PHY) and layer 2 (MAC, RLC, PDCP).

Further, the DL signal transmission unit 201 and the UL signal reception unit 202 include a function for performing operations of the base station eNB in the DRX control operation, the measurement control operation according to the measurement gap, the RA procedure, etc., as described above.

The RRC management unit 203 includes a function for transmitting and receiving an RRC signal to and from the user apparatus UE, and performing processing of CA setting/changing/managing, configuration change, etc. The RRC management unit 203 is a function unit for performing CA setting, and may be referred to as a setting unit. Further, the RRC management unit 203 may include a function for transmitting the timer instruction information to the user apparatus UE via the DL signal transmission unit 201. The above function may be included in a function unit other than the RRC management unit 203 in the base station eNB.

The scheduling unit 204 includes a function of performing scheduling for each cell for the user apparatus UE for which CA is provided, generating PDCCH allocation information, and causing the DL signal transmission unit 201 to transmit a PDCCH including the allocation information.

The structure of the base station eNB illustrated in FIG. 13 may be entirely realized by hardware circuit (e.g., one or more IC chips), or may be partially realized by hardware circuit and the remaining part may be realized by a CPU and programs.

Figure 14:
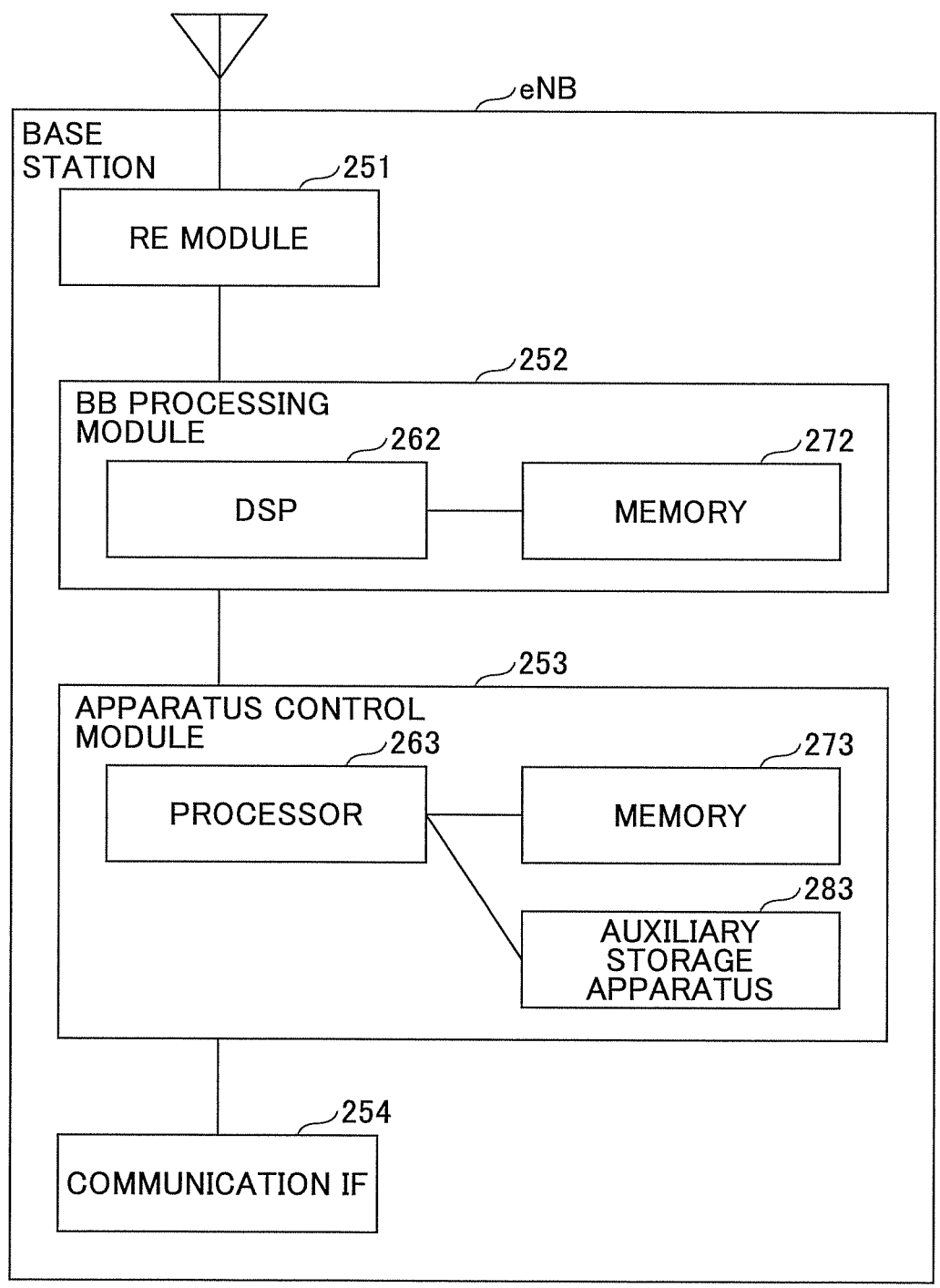
FIG. 14 is a hardware (HW) configuration diagram of the base station eNB.

FIG. 14 is a drawing illustrating an example of a hardware (HW) configuration of the base station eNB. FIG. 14 illustrates a structure closer to an implementation example compared to FIG. 13. As illustrated in FIG. 14, the base station eNB includes an RE module 251 for performing processing related to a wireless signal, a BB processing module 252 for performing baseband signal processing, an apparatus control module 253 for performing processing of an upper layer, etc., and a communication IF 254 as an interface for connecting to a network.

The RE module 251 generates a radio signal to be transmitted from an antenna by performing D/A conversion, modulation, frequency conversion, power amplification, etc., for a digital baseband signal received from the BB processing module 252. Further, the RE module 251 generates a digital baseband signal by performing frequency conversion, A/D conversion, demodulation, etc., for a received radio signal, and transmits the generated signal to the BB processing module 252. The RE module 251 has, for example, a function of physical layer, etc., in the DL signal transmission unit 201 and the UL signal reception unit 202 illustrated in FIG. 13.

The BB processing module 252 performs processing of converting bidirectionally between an IP packet and a digital baseband signal. A DSP 262 is a processor for performing signal processing in the BB processing module 252. A memory 272 is used as a work area of the DSP 262. The BB processing module 252 has, for example, a function of layer 2, etc., in the DL signal transmission unit 201 and the UL signal reception unit 202 illustrated in FIG. 13, and includes the RRC management unit 203 and the scheduling unit 204. It should be noted that all or a part of functions of the RRC management unit 203 and the scheduling unit 204 may be included in the apparatus control module 253.

The apparatus control module 253 performs IP layer protocol processing, OAM processing, etc. A processor 263 performs processing for the apparatus control module 253. A memory 273 is used as a work area of the processor 263. An auxiliary storage apparatus 283 is, for example, a HDD, etc., and stores various types of setting information items, etc., used for operations of the base station eNB.

As described above, according to an embodiment, a user apparatus is provided. The user apparatus communicates with a base station in a mobile communication system. The mobile communication system supports carrier aggregation which includes multiple cells including a first cell and a second cell which uses a TTI different from a TTI of the first cell. The user apparatus includes a communication unit configured to transmit and receive a signal to and from the base station; and a timer control unit configured to, according to a type of a control operation performed by the communication unit, determine a TTI as a unit time of an operation of a timer used for the control operation. The communication unit performs the control operation by operating the timer by using as a unit time the TTI determined by the timer control unit.

With the above arrangement, it is possible, in a mobile communication system which supports carrier aggregation including a plurality of cells with different TTIs, to appropriately determine the TTI used as a reference for a timer control operation of the user apparatus.

In the case where a discontinuous reception control operation is performed by the communication unit, the timer control unit may determine a longer TTI, of a TTI of the first cell and a TTI of the second cell, as a unit time of an operation of a timer used for the discontinuous reception control operation, and the communication unit performs the discontinuous reception control operation by operating the timer by using as a unit time the determined TTI. With the above arrangement, it is possible to avoid complication of the apparatus implementation.

In the case where the discontinuous reception control operation is performed by the communication unit, the timer control unit may determine a shorter TTI, of a TTI of the first cell and a TTI of the second cell, as a unit time of an operation of a timer used for the discontinuous reception control operation, and the communication unit performs the discontinuous reception control operation by operating the timer by using as a unit time the determined TTI. With the above arrangement, it is possible to cause the user apparatus to transition between an active state and an inactive state with fine control based on a shorter TTI, and thus, it is possible to achieve more flexible battery saving.

In the case where a random access procedure is performed by the communication unit, the timer control unit may determine a TTI of a cell via which a random access response is received, of a TTI of the first cell and a TTI of the second cell, as a unit time of an operation of a timer related to a random access response window, and the communication unit performs receiving the random access response by operating the timer by using as a unit time the determined TTI. With the above arrangement, opportunities for receiving the RA response are increased and the performance is improved.

Further, in the case where neighbor cell measurement using a measurement gap is performed by the communication unit, the timer control unit may determine a longer TTI, of a TTI of the first cell and a TTI of the second cell, as a unit time of an operation of a timer used for timing the measurement gap, and the communication unit performs the neighbor cell measurement using the measurement gap by operating the timer by using as a unit time the determined TTI. With the above arrangement, it is possible to secure sufficient time for the neighbor cell measurement and it is possible to perform a mobility control operation appropriately.

In the case where the communication unit determines whether transitioning from a serving cell to another cell should be performed based on downlink radio quality measurement, the timer control unit may determine a longer TTI, of a TTI of the first cell and a TTI of the second cell, as a unit time of an operation of a timer used for the determination, and the communication unit performs determining whether transitioning from a serving cell to another cell should be performed based on downlink radio quality measurement by operating the timer by using as a unit time the determined TTI. With the above arrangement, it is possible to suppress occurrence of a ping-pong state, and it is possible to perform a stable control operation.

The timer control unit may determine the TTI used as a unit time of an operation of the timer based on an instruction from the base station. With the above arrangement, for example, it is possible to perform a flexible control operation according to network policy.

The user apparatus UE according to an embodiment may include a CPU (processor) and a memory, may be realized by having a program executed by the CPU, may be realized by hardware such as hardware circuitry process in which the logic described in an embodiment is included, or may be realized by a mixture of a program and hardware.

The base station eNB according to an embodiment may include a CPU (processor) and a memory, may be realized by having a program executed by the CPU, may be realized by hardware such as hardware circuitry process in which the logic described in an embodiment is included, or may be realized by a mixture of a program and hardware.

As described above, embodiments have been described. The disclosed invention is not limited to these embodiments, and a person skilled in the art would understand various variations, modifications, replacements, or the like. Specific examples of numerical values have been used for encouraging understanding of the present invention. These numeric values are merely examples and, unless otherwise noted, any appropriate values may be used. In the above description, partitioning of items is not essential to the present invention. Matters described in more than two items may be combined if necessary. Matters described in one item may be applied to matters described in another item (as long as they do not conflict). In a functional block diagram, boundaries of functional units or processing units do not necessarily correspond to physical boundaries of parts. Operations of multiple functional units may be physically performed in a single part, or operations of a single functional unit may be physically performed by multiple parts. For the sake of description convenience, the user apparatus and the base station have been described using functional block diagrams. These apparatuses may be implemented by hardware, by software, or by combination of both. The software which is executed by a processor included in a user apparatus according to an embodiment and the software which is executed by a processor included in a base station may be stored in a random access memory (RAM), a flash memory, a read-only memory (ROM), an EPROM, an EEPROM, a register, a hard disk drive (HDD), a removable disk, a CD-ROM, a database, a server, or any other appropriate recording medium. The present invention is not limited to the above embodiments and various variations, modifications, alternatives, replacements, etc., may be included in the present invention without departing from the spirit of the invention.

The present application is based on and claims the benefit of priority of Japanese Priority Application No. 2015-032342 filed on Feb. 20, 2015, the entire contents of which are hereby incorporated by reference.

DESCRIPTION OF THE REFERENCE NUMERALS

UE user apparatus
eNB base station
101 UL signal transmission unit
102 DL signal reception unit
103 RRC management unit
104 Timer control unit
151 RE module
152 BB processing module
153 Apparatus control module
154 USIM slot
201 DL signal transmission unit
202 UL signal reception unit
203 RRC management unit
204 scheduling unit
251 RE module 252 BB processing module
253 Apparatus control module
254 Communication IF

What is claimed is:

1. A user apparatus that communicates with a base station in a mobile communication system which supports carrier aggregation and includes a plurality of cells including a first cell that uses a first time interval and a second cell that uses a second time interval different from the first time interval, the user apparatus comprising:
a transceiver that transmits and receives a signal to and from the base station; and
a processor that determines, according to a type of a control operation performed by the transceiver, a time interval selected from the first time interval and the second time interval that is used as a unit time for operating a timer used for the control operation, wherein
the transceiver performs the control operation by operating the timer using the determined time interval as a unit time.

2. The user apparatus according to claim 1, wherein when the transceiver performs a discontinuous reception control operation, the processor determines a longer time interval, of the first time interval and the second time interval, as a unit time for operating the timer used for the discontinuous reception control operation, and
the transceiver performs the discontinuous reception control operation by operating the timer using the determined time interval as a unit time.

3. The user apparatus according to claim 1, wherein in the case where the transceiver performs a discontinuous reception control operation, the processor determines a shorter time interval, of the first time interval and the second time interval, as a unit time for operating the timer used for the discontinuous reception control operation, and
the transceiver performs the discontinuous reception control operation by operating the timer using the determined time interval as a unit time.

4. The user apparatus according to claim 1, wherein in the case where the transceiver performs a random access procedure, the processor determines a time interval of a cell via which a random access response is received, of the first time interval and the second time interval, as a unit time for operating the timer related to a random access response window, and
the transceiver performs receiving the random access response by operating the timer using the determined time interval as a unit time.

5. The user apparatus according to claim 1, wherein in the case where the transceiver performs neighbor cell measurement using a measurement gap, the processor determines a longer time interval, of the first time interval and the second time interval, as a unit time for operating the timer used for timing the measurement gap, and
the transceiver performs the neighbor cell measurement using the measurement gap by operating the timer using the determined time interval as a unit time.

6. The user apparatus according to claim 1, wherein in the case where the transceiver performs determining whether transitioning from a serving cell to another cell should be performed based on downlink radio quality measurement, the processor determines a longer time interval, of the first time interval and the second time interval, as a unit time for operating the timer used for the determining, and
the transceiver performs determining whether transitioning from a serving cell to another cell should be performed by operating the timer using the determined time interval as a unit time.

7. The user apparatus according to claim 1, wherein the processor determines the time interval used as a unit time for operating the timer based on an instruction from the base station.

8. A timer control method performed by a user apparatus that communicates with a base station in a mobile communication system that includes a plurality of cells including a first cell that uses a first time interval and a second cell that uses a second time interval different from the first time interval, the timer control method comprising:
determining, according to a type of a control operation performed by a transceiver included in the user apparatus, a time interval selected from the first time interval and the second time interval that is used as a unit time for operating a timer used for the control operation, and
performing the control operation by operating the timer by using the determined time interval as a unit time.

9. The user apparatus according to claim 2, wherein in the case where the transceiver performs a random access procedure, the processor determines a time interval of a cell via which a random access response is received, of the first time interval and the second time interval, as a unit time for operating the timer related to a random access response window, and
the transceiver performs receiving the random access response by operating the timer using the determined time interval as a unit time.

10. The user apparatus according to claim 2, wherein in the case where the transceiver performs neighbor cell measurement using a measurement gap, the processor determines a longer time interval, of the first time interval and the second time interval, as a unit time for operating the timer used for timing the measurement gap, and
the transceiver performs the neighbor cell measurement using the measurement gap by operating the timer using the determined time interval as a unit time.

11. The user apparatus according to claim 2, wherein in the case where the transceiver performs determining whether transitioning from a serving cell to another cell should be performed based on downlink radio quality measurement, the processor determines a longer time interval, of the first time interval and the second time interval, as a unit time for operating the timer used for the determining, and
the transceiver performs determining whether transitioning from a serving cell to another cell should be performed by operating the timer using the determined time interval as a unit time.

12. The user apparatus according to claim 2, wherein the processor determines the time interval used as a unit time for operating the timer based on an instruction from the base station.

13. The user apparatus according to claim 3, wherein in the case where the transceiver performs a random access procedure, the processor determines a time interval of a cell via which a random access response is received, of the first time interval and the second time interval, as a unit time for operating the timer related to a random access response window, and the transceiver performs receiving the random access response by operating the timer using the determined time interval as a unit time.

14. The user apparatus according to claim 3, wherein
in the case where the transceiver performs neighbor cell measurement using a measurement gap, the processor determines a longer time interval, of the first time interval and the second time interval, as a unit time for operating the timer used for timing the measurement gap, and
the transceiver performs the neighbor cell measurement using the measurement gap by operating the timer using the determined time interval as a unit time.

15. The user apparatus according to claim 3, wherein
in the case where the transceiver performs determining whether transitioning from a serving cell to another cell should be performed based on downlink radio quality measurement, the processor determines a longer time interval, of the first time interval and the second time interval, as a unit time for operating the timer used for the determining, and
the transceiver performs determining whether transitioning from a serving cell to another cell should be performed by operating the timer using the determined time interval as a unit time.

16. The user apparatus according to claim 3, wherein
the processor determines the time interval used as a unit time for operating the timer based on an instruction from the base station.

17. The user apparatus according to claim 4, wherein
in the case where the transceiver performs neighbor cell measurement using a measurement gap, the processor determines a longer time interval, of the first time interval and the second time interval, as a unit time for operating the timer used for timing the measurement gap, and
the transceiver performs the neighbor cell measurement using the measurement gap by operating the timer using as the determined time interval a unit time.

18. The user apparatus according to claim 4, wherein
in the case where the transceiver performs determining whether transitioning from a serving cell to another cell should be performed based on downlink radio quality measurement, the processor determines a longer time interval, of the first and a the second time interval, as a unit time for operating the timer used for the determining, and
the transceiver performs determining whether transitioning from a serving cell to another cell should be performed by operating the timer using the determined time interval as a unit time.

19. The user apparatus according to claim 4, wherein
the processor determines the time interval used as a unit time for operating the timer based on an instruction from the base station.

20. The user apparatus according to claim 5, wherein
in the case where the transceiver performs determining whether transitioning from a serving cell to another cell should be performed based on downlink radio quality measurement, the processor determines a longer time interval, of the first time interval and the second time interval, as a unit time for operating the timer used for the determining, and
the transceiver performs determining whether transitioning from a serving cell to another cell should be performed by operating the timer using the determined time interval as a unit time.

* * * * *